US007004771B1

(12) United States Patent
Lee (10) Patent No.: US 7,004,771 B1
(45) Date of Patent: Feb. 28, 2006

(54) ELECTRONIC CARD CONNECTOR CAPABLE OF DRIVING BOTH SIDES OF AN ELECTRONIC CARD TO EXTRACT THE ELECTRONIC CARD

(75) Inventor: Ipson Lee, Taoyuan (TW)

(73) Assignee: Super Link Electronics Co., Ltd., Taoyuan (TW)

( * ) Notice: Subject to any disclaimer, the term of this patent is extended or adjusted under 35 U.S.C. 154(b) by 0 days.

(21) Appl. No.: 11/078,303

(22) Filed: Mar. 14, 2005

(51) Int. Cl.
*H01R 13/62* (2006.01)
(52) U.S. Cl. .................................... 439/159; 439/152
(58) Field of Classification Search ............... 439/159, 439/160, 152–158
See application file for complete search history.

(56) References Cited

U.S. PATENT DOCUMENTS

| 6,332,790 B1 * | 12/2001 | Ishikawa et al. ............ 439/157 |
| 6,482,020 B1 * | 11/2002 | Yeh ............................. 439/159 |
| 6,520,784 B1 * | 2/2003 | Ito et al. ..................... 439/159 |
| 6,739,890 B1 * | 5/2004 | Hirata et al. ................ 439/159 |
| 6,817,874 B1 * | 11/2004 | Okabe ........................ 439/157 |

* cited by examiner

*Primary Examiner*—P. Austin Bradley
*Assistant Examiner*—X. Chung-Trans
(74) *Attorney, Agent, or Firm*—Rosenberg, Klein & Lee (57) ABSTRACT

An electronic card connector capable of driving both sides of an electronic card to extract the electronic card. The electronic card connector includes a main body formed with an insertion socket. A terminal seat being disposed at front end of the insertion socket. A first and a second slide members respectively slidably disposed on a first and a second sides of the insertion socket. The first and second slide members serving to respectively abut against a first and a second side of an electronic card inserted in the insertion socket, a spring being hooked between each of the first and second slide members and the main body. A locating unit disposed between each of the first and second slide members and the main body. In the card-retreating operation, the first and second slide members are synchronously driven and retreated by the springs to push two sides of the electronic card.

11 Claims, 12 Drawing Sheets

ELECTRONIC CARD CONNECTOR CAPABLE OF DRIVING BOTH SIDES OF AN ELECTRONIC CARD TO EXTRACT THE ELECTRONIC CARD

BACKGROUND OF THE INVENTION

1. Field of the Invention

The present invention is related to an electronic card connector capable of driving both sides of an electronic card to extract the electronic card. A first and a second slide members are slidably disposed on two sides of the electronic card connector. In card-retreating operation, the first and second slide members synchronously push two sides of the electronic card inserted in the electronic card connector. A force is evenly applied to the electronic card to stably retreat the electronic card out of the electronic card connector.

2. Description of the Prior Art

Figure 17:
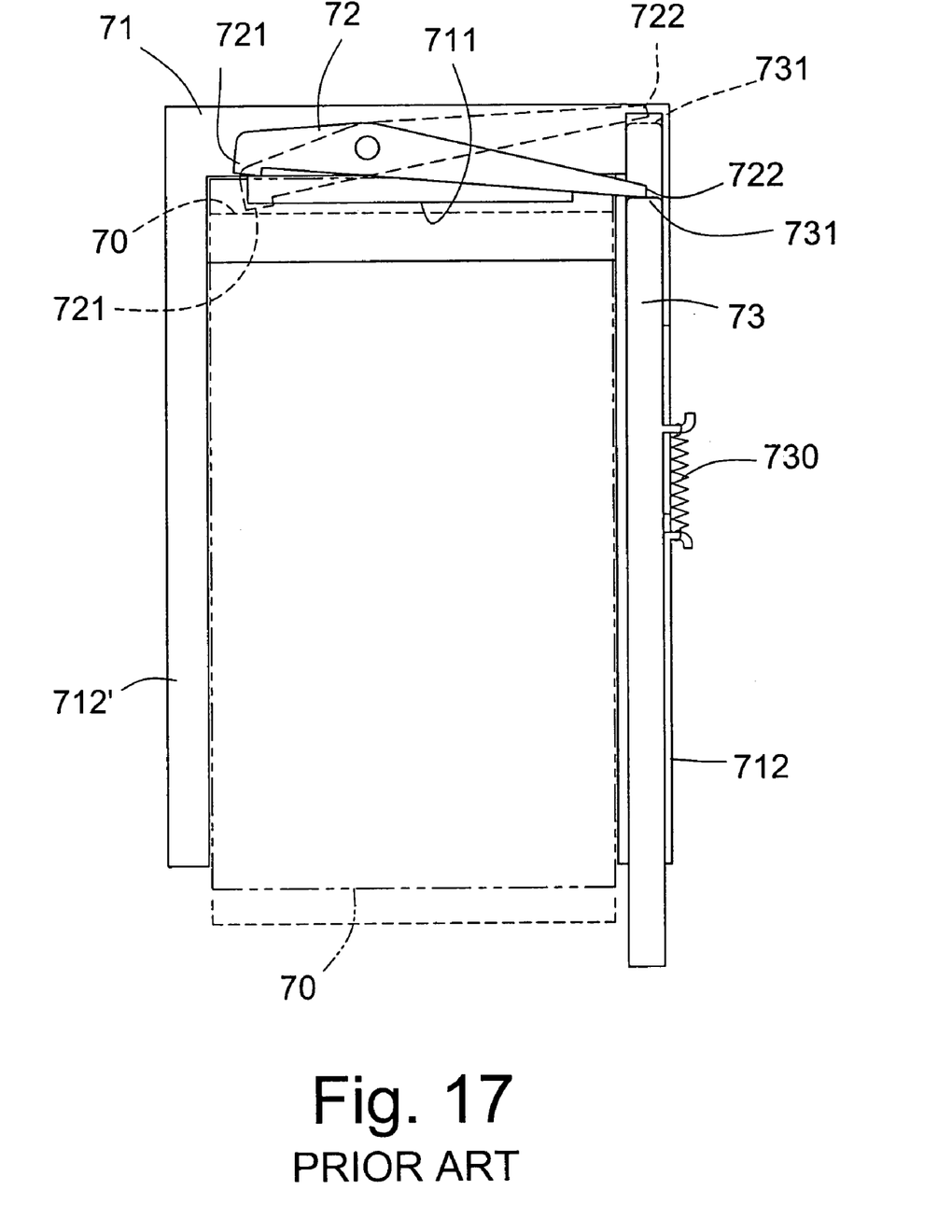
FIG. 17 shows a conventional electronic card connector.

A conventional electronic card connector has a card-extracting mechanism. By means of pressing the card-extracting mechanism, the electronic card inserted in the electronic card connector can be retreated and extracted. FIG. 17 shows the conventional electronic card connector. The conventional electronic card connector includes a seat body 71 in which a terminal connecting section 711 is disposed. A pair of lateral arms 712, 712' are parallelly disposed on two sides of the seat body 71. An electronic card slide channel is defined between the lateral arms 712, 712'. An electronic card 70 can be inserted into the electronic card slide channel. The conventional electronic card connector further includes a push board 72 pivotally mounted on the seat body 71 and a push bar 73 slidably disposed in one lateral arm 712. In normal state, a spring 730 forces the push bar 73 to retreat.

When an electronic card 70 is inserted, the front edge of the electronic card will push a first end 721 of the push board 72. At this time, a second end 722 of the push board 72 is biased to a front end 731 of the push bar 73. When it is desired to retreat the electronic card 70, the push bar 73 is pushed forward to drivingly push the second end 722 of the push board 72. At this time, as a teeter, the first end 721 of the push board 72 pushes the front edge of the electronic card 70 to retreat the same as shown by phantom line of FIG. 17.

In the above electronic card connector, when retreating the electronic card, the push board 72 simply pushes one single side of the electronic card 70. Therefore, it often takes place that the electronic card 70 is biased to one side to clog the electronic card connector. Accordingly, with the conventional electronic card connector, the electronic card can be hardly smoothly retreated.

SUMMARY OF THE INVENTION

It is therefore a primary object of the present invention to provide an electronic card connector capable of driving both sides of an electronic card to extract the electronic card. The electronic card connector includes: a main body formed with an insertion socket, a terminal seat being disposed at front end of the insertion socket; a first slide member slidably disposed on a first side of the insertion socket, the first slide member serving to abut against a first side of an electronic card inserted in the insertion socket, a spring being hooked between the first slide member and the main body, whereby in normal state, the spring forces the first slide member away from the terminal seat; and a second slide member slidably disposed on a second side of the insertion socket opposite to the first slide member, the second slide member serving to abut against a second side of an electronic card inserted in the insertion socket, a spring being hooked between the second slide member and the main body, whereby in normal state, the spring forces the second slide member away from the terminal seat. The two springs can synchronously drive and retreat the first and second slide members to push and extract the electronic card out of the electronic card connector.

The present invention can be best understood through the following description and accompanying drawings wherein:

DETAILED DESCRIPTION OF THE PREFERRED EMBODIMENTS

Please refer to FIGS. 1 to 16. The present invention is related to an electronic card connector capable of driving both sides of an electronic card to extract the electronic card. The electronic card connector includes a main body 10 formed with an insertion socket 11. A terminal seat 12 is disposed at front end of the insertion socket 11. The electronic card connector further includes a first slide member 20 slidably disposed on a first side 11a of the insertion socket 11. The first slide member 20 serves to abut against a first side of an electronic card 50 inserted in the insertion socket. A spring 20a is hooked between the first slide member 20 and the main body, whereby in normal state, the spring 20a forces the first slide member 20 away from the terminal seat 12. The electronic card connector further includes a second slide member 30 slidably disposed on a second side 11b of the insertion socket 11 opposite to the first slide member 20. The second slide member 30 serves to abut against a second side of an electronic card 50 inserted in the insertion socket. A spring 30a is hooked between the second slide member 30 and the main body 10, whereby in normal state, the spring 30a forces the second slide member 30 away from the terminal seat 12. The two springs 20a, 30a can synchronously drive and retreat the first and second slide members 20, 30 to push the electronic card 50 out of the electronic card connector.

Referring to FIGS. 1, 2, 9 and 10, the first and second slide members 20, 30 are respectively slidably disposed on two sides of the insertion socket 11 of the main body 10 of the electronic card connector. When retreating the electronic card, the first and second slide members 20, 30 synchronously push two sides of the electronic card 50 inserted in the electronic card connector. Accordingly, the electronic card 50 is evenly forced and extracted out of the electronic card connector. Therefore, the electronic card can be smoothly retreated.

Figure 1:
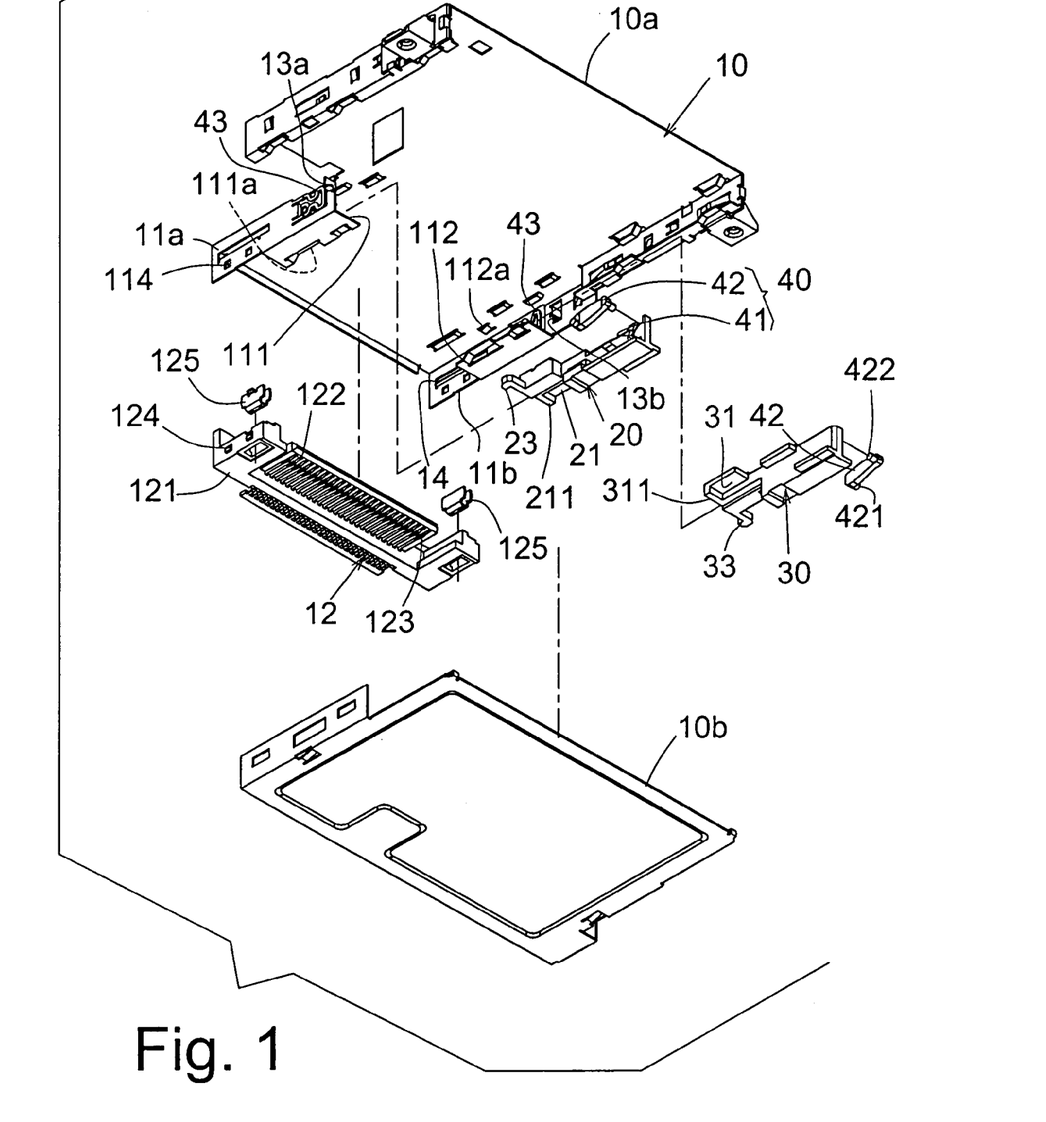
FIG. 1 is a perspective exploded view of the present invention.
Figure 2:
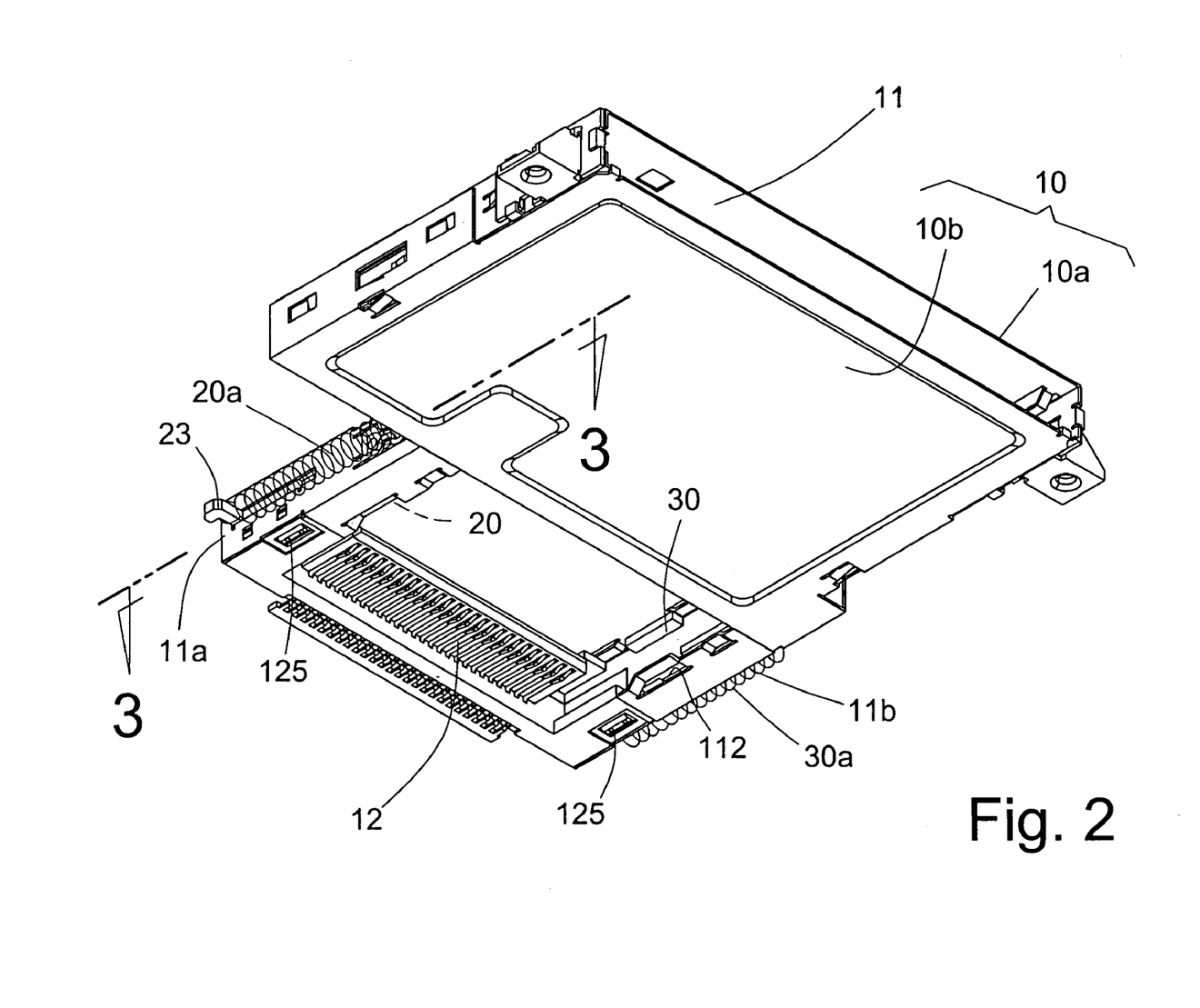
FIG. 2 is a perspective assembled view of the present invention.
Figure 3:
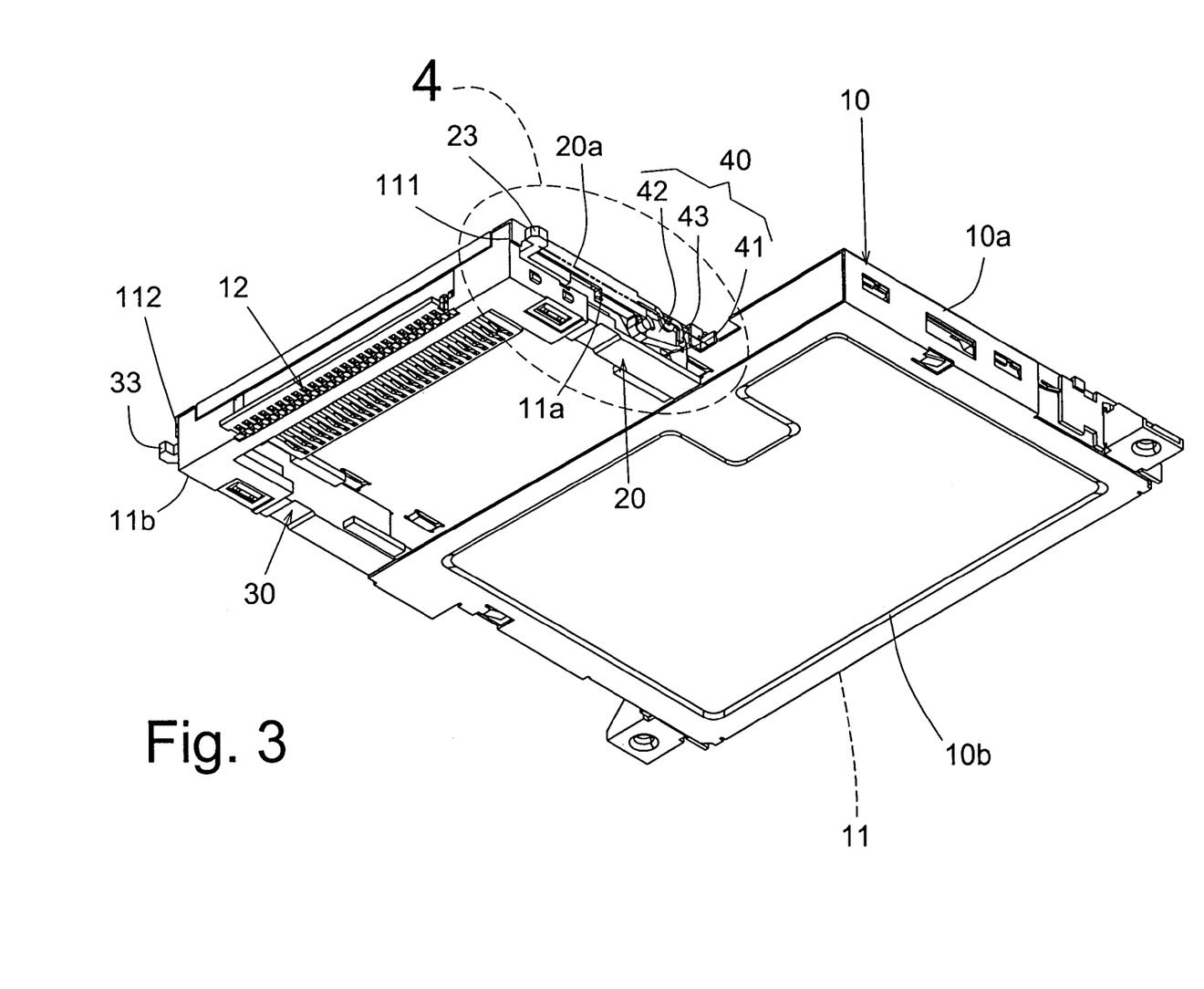
FIG. 3 is a partially sectional view taken along line 3—3 of FIG. 2.
Figure 4:
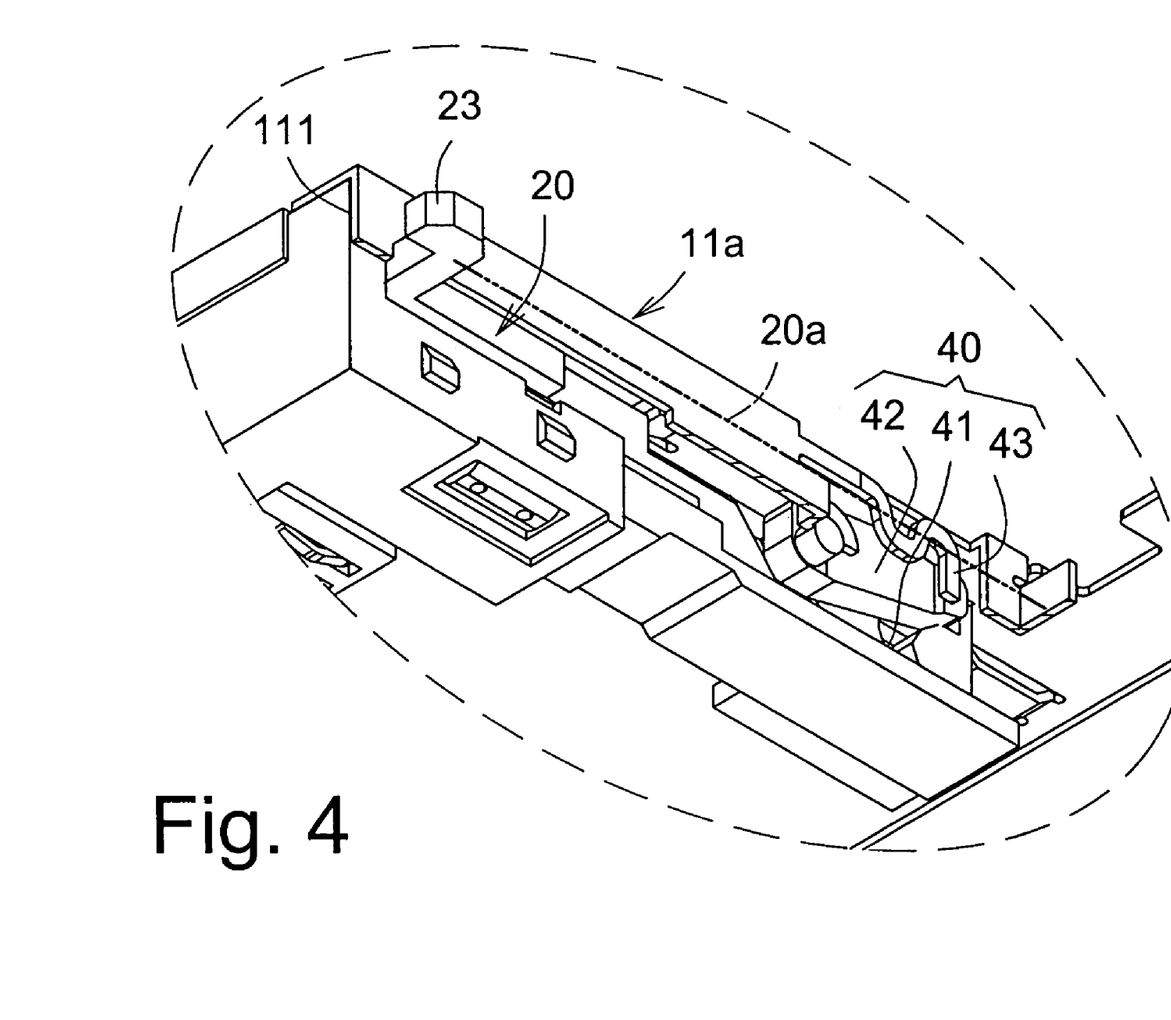
FIG. 4 is an enlarged view of circled area 4 of FIG. 3.

Referring to FIGS. 1 and 2, the main body 10 of the electronic card connector is composed of two casings 10a, 10b mated with each other. The casings 10a, 10b define an insertion socket 11 in which at least one type of electronic card 50 can be inserted. Two opposite sides of the insertion socket 11 are respectively formed with two guide rails 111, 112 in which the first and second slide members 20, 30 are respectively correspondingly accommodated. The first and second slide members 20, 30 are guided by the guide rails 111, 112 to stably slide along two opposite sides of the insertion socket 11. Two projecting hooks 13a, 13b are respectively disposed on two sides of the main body 10 for hooking the first ends 201, 301 of the springs 20a, 30a for driving the first and second slide members 20, 30.

The casings 10a, 10b of the main body 10 is made of metal or other conductive material for shielding the electronic card inserted in the insertion socket 11 from interference of external electromagnetic wave. Accordingly, the quality of signal transmission can be maintained.

Referring to FIG. 1, the terminal seat 12 positioned at the front end of the insertion socket 11 has an insulating seat body 121. The insulating seat body 121 is formed with multiple terminal cavities 122 which are side by side arranged. A terminal 123 is inlaid in each terminal cavity 122. Two sides of the insulating seat body 121 are formed with locating projecting sections 124 which are correspondingly latched in latch holes 114 of the sidewalls of the insertion socket 11. Accordingly, the terminal seat 12 can be firmly located at the front end of the insertion socket 11. In addition, a connecting member 125 is inlaid in each side of the insulating seat body 121. When the terminal seat 12 is latched in the insertion socket 11, the connecting member 125 is tightly hooked with a skirt section 14 of the main body for firmly connecting the terminal seat with the main body. One end of the connecting member 125 can be connected with a grounding circuit of a circuit board (not shown) to ground the electronic card connector.

Figure 5:
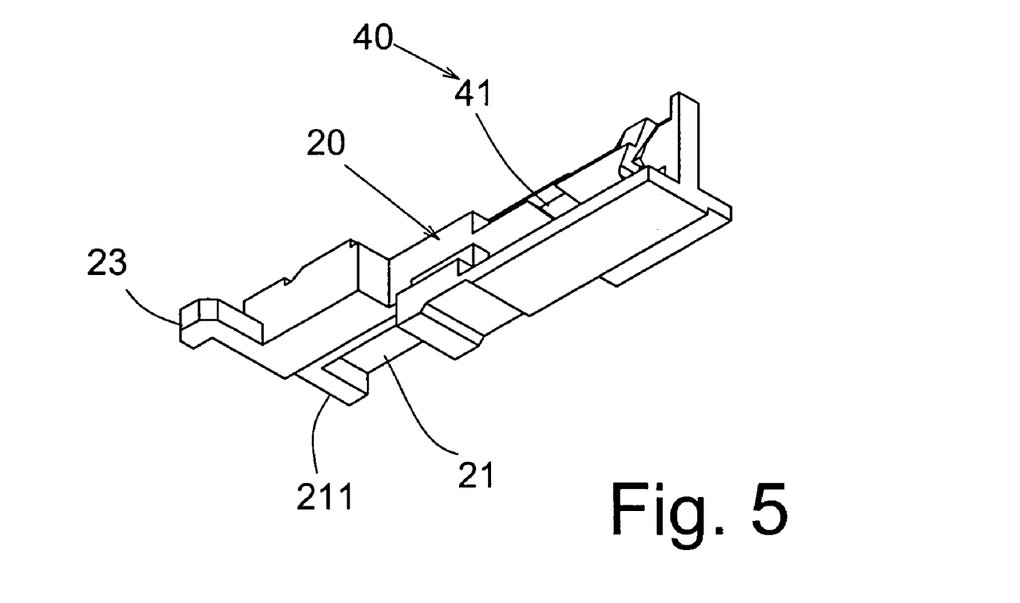
FIG. 5 is a bottom perspective view of the first slide member of the present invention.
Figure 6:
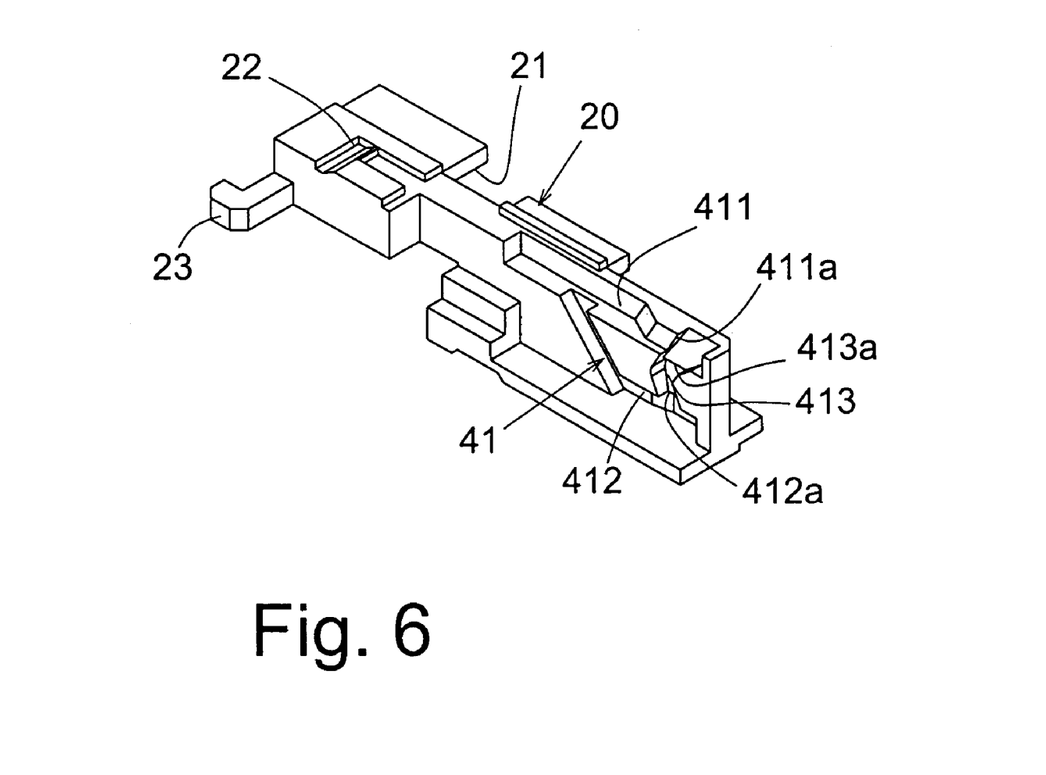
FIG. 6 is a top perspective view of the first slide member of the present invention.
Figure 7:
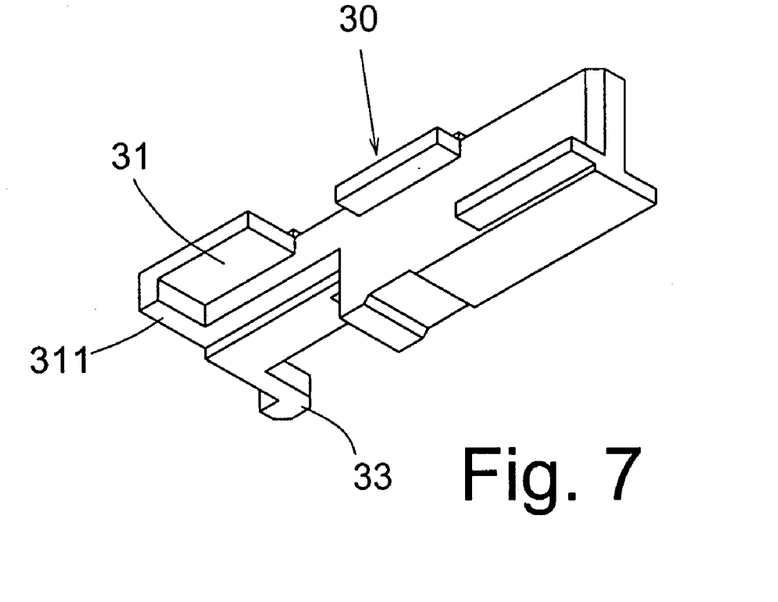
FIG. 7 is a bottom perspective view of the second slide member of the present invention.
Figure 8:
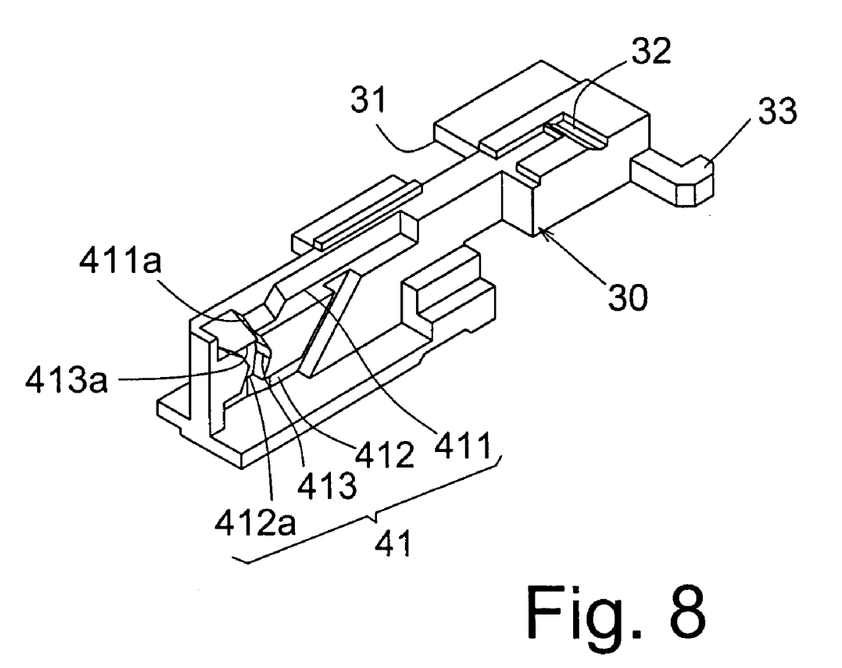
FIG. 8 is a top perspective view of the second slide member of the present invention.

Referring to FIGS. 1, 5 and 6, the first slide member 20 is an integrally formed elongated bar body. The first slide member 20 is fitted in the guide rail 111 of the first side 11a of the insertion socket 11 of the main body 10. A carrier platform section 21 is transversely formed at front end of the first slide member 20. A stop wall 211 is formed on front edge of the carrier platform section 21 for abutting against front edge 51 of the first side of the electronic card 50 inserted in the insertion socket 11. A bottom end of the first slide member 20 is formed with a locating dent 22. When the first slide member 20 is retreated within the guide rail 111 to a certain position, the wall of the locating dent 22 abuts against a locating projecting section 111a formed in the guide rail 111, whereby the first slide member 20 is stopped from being further pulled backward by the spring 20a.

A hook arm 23 projects from one side of the first slide member 20. The hook arm 23 extends out of the guide rail 111 to hook the second end 202 of the spring 20a.

Referring to FIGS. 1, 2, 7 and 8, the second slide member 30 is an integrally formed elongated bar body. The second slide member 30 is fitted in the guide rail 112 of the second side 11b of the insertion socket 11 of the main body 10. A carrier platform section 31 is transversely formed at front end of the second slide member 30. A stop wall 311 is formed on front edge of the carrier platform section 31 for abutting against front edge 52 of the second side of the electronic card 50 inserted in the insertion socket 11. A bottom end of the second slide member 30 is formed with a locating dent 32. When the second slide member 30 is retreated within the guide rail 112 to a certain position, the wall of the locating dent 32 abuts against a locating projecting section 112a formed in the guide rail 112, whereby the second slide member 30 is stopped from being further pulled backward by the spring 30a.

A hook arm 33 projects from one side of the second slide member 30. The hook arm 33 extends out of the guide rail 112 to hook the second end 302 of the spring 30a.

Referring to FIGS. 1, 3, 4, 12 to 16, the electronic card connector of the present invention further includes a locating unit 40 disposed between the first slide member 20 and the main body 10 or between the second slide member 30 and the main body 10 or between the first and second slide members 20, 30 and the main body 10 for dogging the first and second slide members 20, 30.

Referring to FIGS. 1, 3, 4 and 12, the locating unit 40 includes a guide channel section 41 formed on the first slide member 20 or the second slide member 30. The guide channel section 41 includes a first guide channel 411 and a second guide channel 412. A V-shaped guide channel 413 communicates rear ends of the first and second guide channels 411, 412. A front end of the second guide channel 412 obliquely connects with the first guide channel 411. The locating unit 40 further includes a locating block 42. A first end of the locating block 42 has a shaft section 421 pivotally mounted in the guide rail 111 or 112. A second end of the locating block 42 has a projecting guide pin 422 slidably positioned in the guide channel section 41 in normal state. The locating unit 40 further includes a resilient arm 43 formed on the guide rail 111 or 112. In normal state, the resilient arm 43 pushes the second end of the locating block 42 toward the guide channel section 41, whereby the guide pin 422 of the second end of the locating block 42 is extended into the guide channel section 41 and can be stably slid within and along the guide channel section 41.

Figure 12:
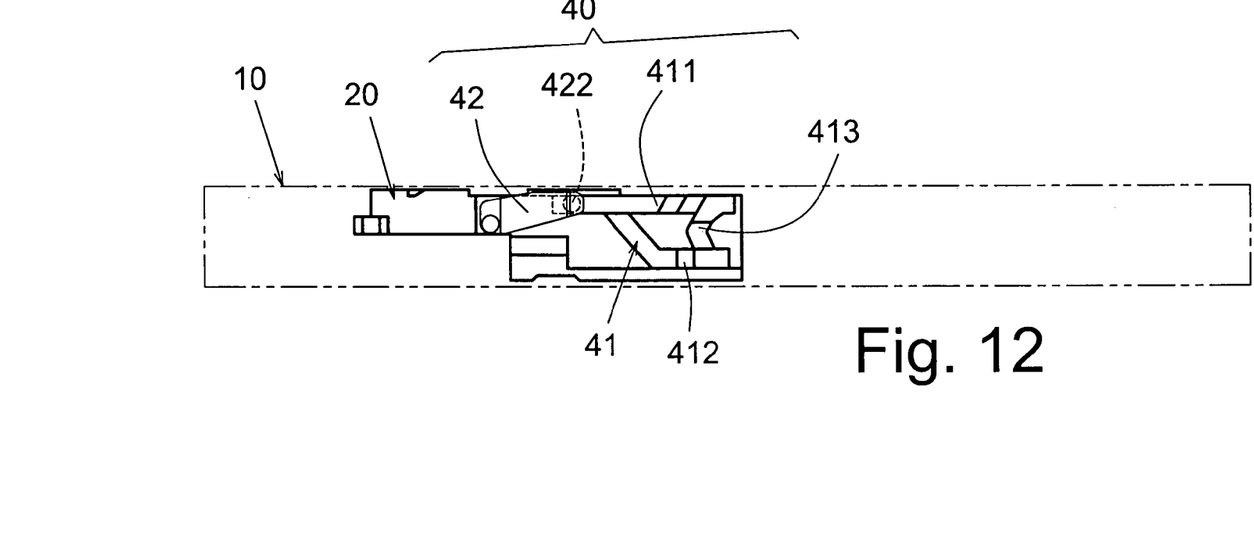
FIG. 12 shows the relationship between the components of the locating unit, in which the electronic card has not yet been inserted into the electronic card connector.

A first stop shoulder 411a is formed between the rear end of the first guide channel 411 and the V-shaped guide channel 413. The first stop shoulder 411a serves to stop the guide pin 422 of the locating block 42 from moving back from the exit of front end of the first guide channel 411 after the guide pin 422 moves through the V-shaped guide channel 413. A second stop shoulder 413a is defined at the middle of the V-shaped guide channel 413. A third stop shoulder 412a is formed between the V-shaped guide channel 413 and the entrance of front end of the second guide channel 412. During circulation, the stop shoulders serve to prevent the guide pin 422 of the locating block 42 from moving in reverse direction, that is, moving from the second guide channel along the V-shaped guide channel back to the first guide channel.

Figure 9:
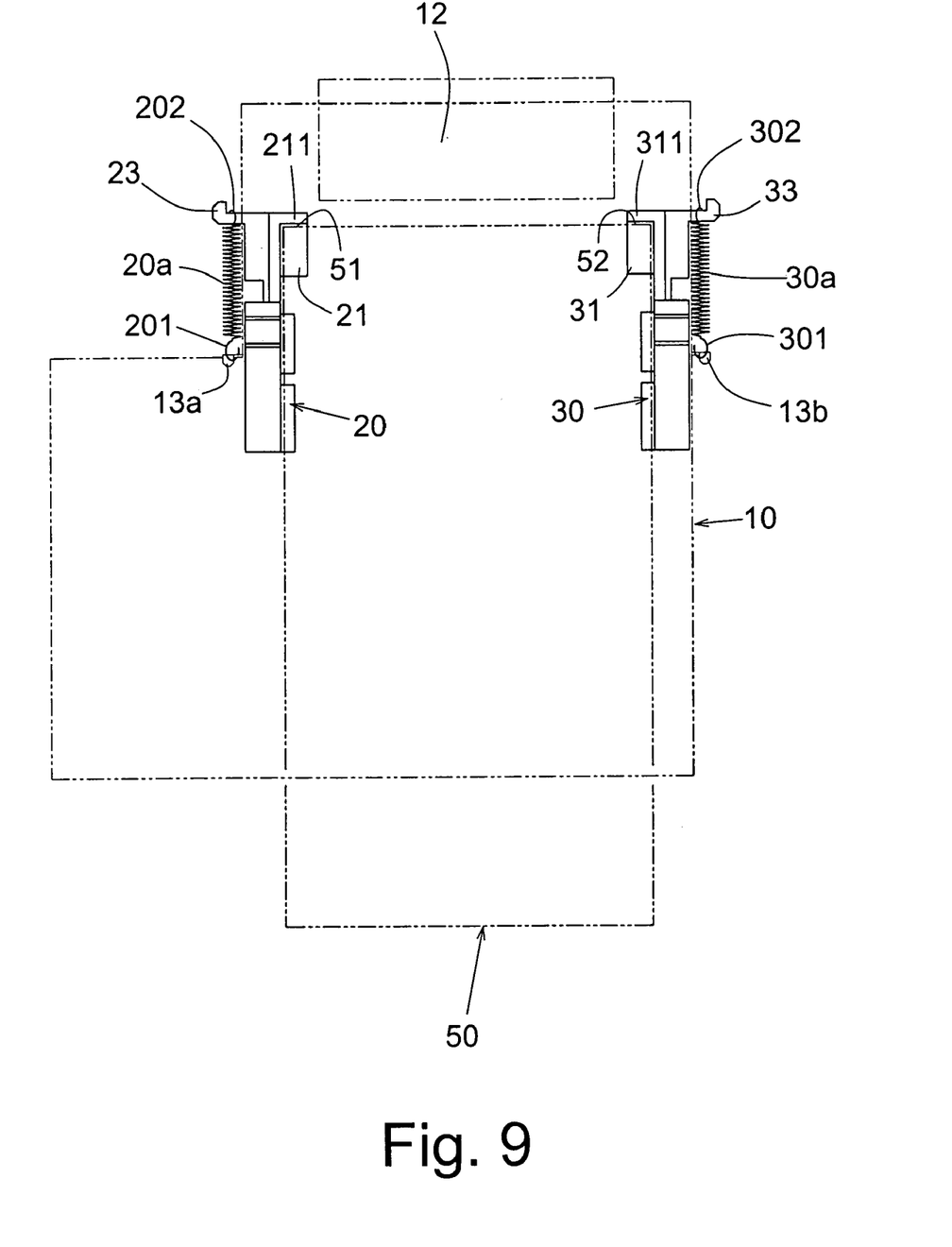
FIG. 9 shows that the electronic card has not yet been inserted into the electronic card connector or is retreated out of the electronic card connector.

Referring to FIGS. 9 and 12, in the case that no electronic card 50 is inserted in the electronic card connector or the inserted electronic card has not yet pushed the first and second slide members 20, 30, the first and second slide members 20, 30 are automatically restored by the springs 20a, 30a to the first position, that is, the original position. At this time, the guide pin 422 of the locating block 42 of the locating unit 40 extends in the front end of the first guide channel 411.

Figure 10:
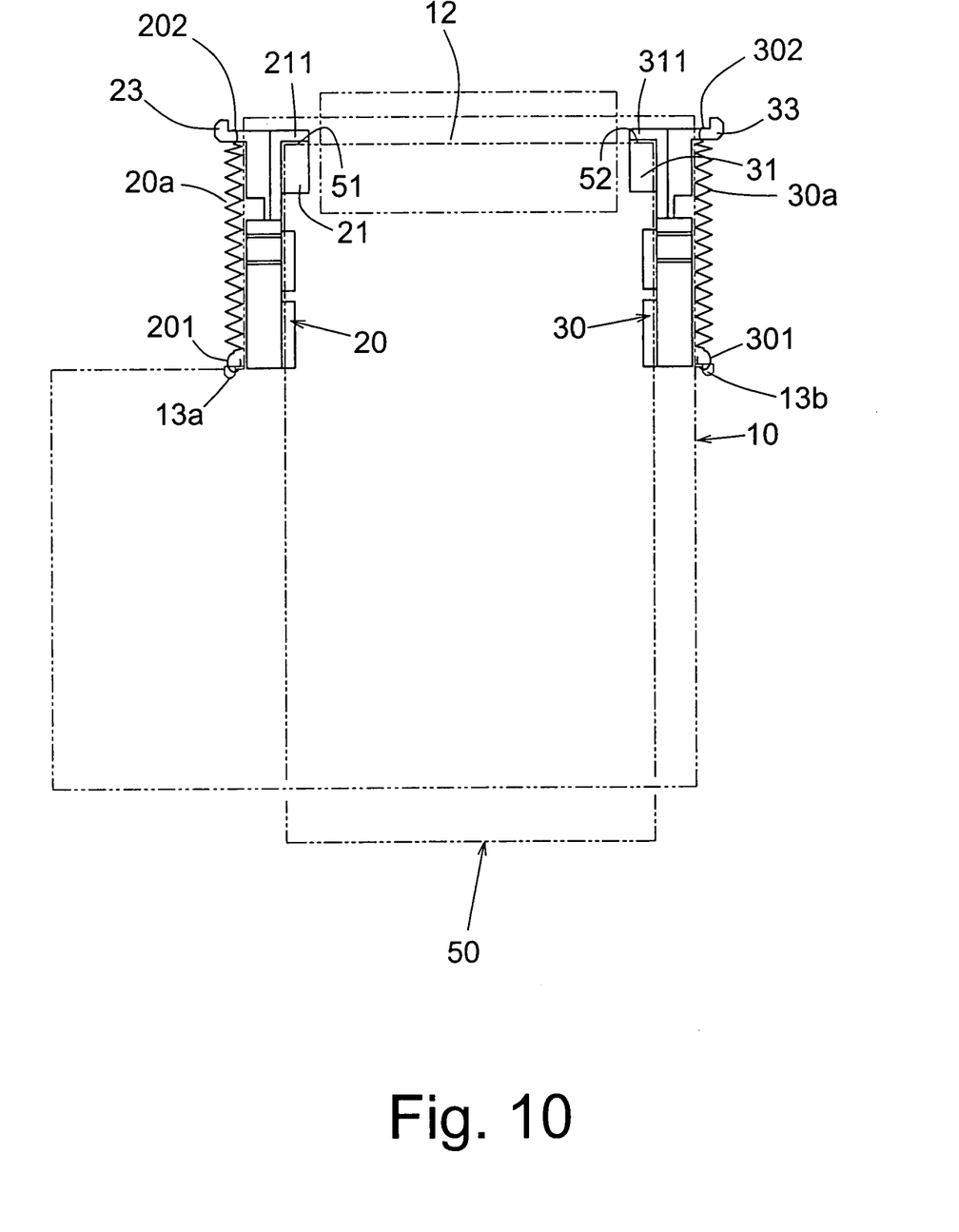
FIG. 10 shows that the electronic card is inserted in the electronic card connector.
Figure 11:
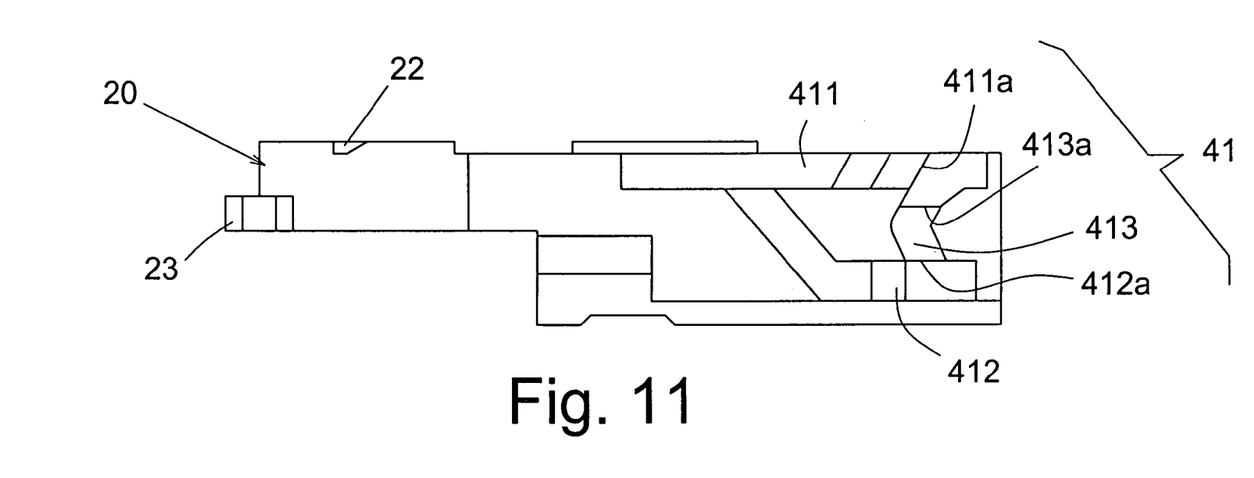
FIG. 11 is a plane view showing the guide channel section of the locating unit of the present invention.
Figure 13:
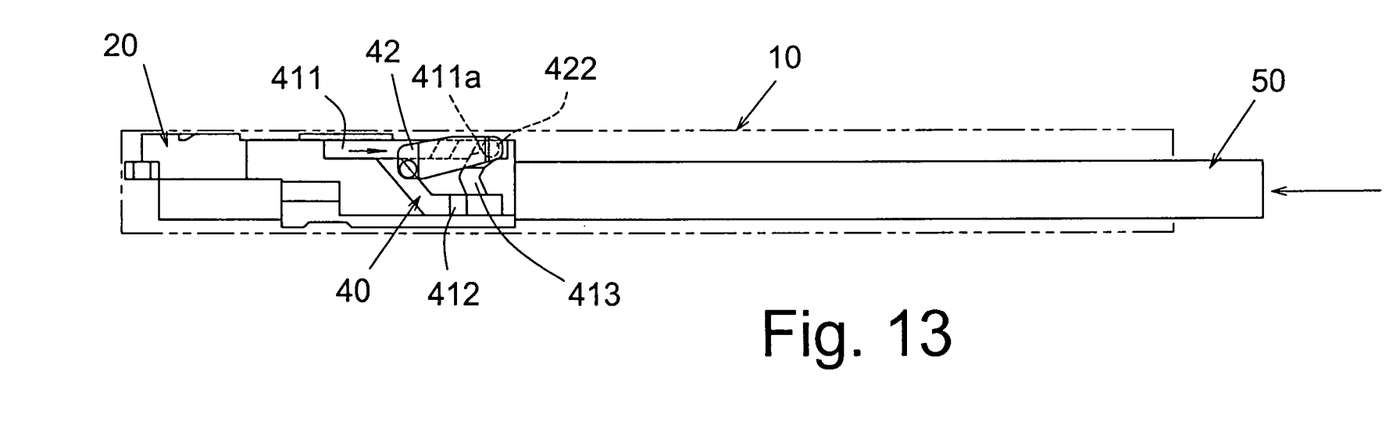
FIG. 13 shows the relationship between the components of the locating unit, in which the electronic card is forward pushed from the state of FIG. 12.

Referring to FIGS. 10 and 13, when an electronic card 50 is inserted into the electronic card connector and pushed forward by a user, the front edges 51, 52 of the first and second sides of the electronic card 50 are overlaid on the carrier platform sections 21, 31 of the first and second slide members 20, 30 to abut against the stop walls 211, 311. At this time, the first and second slide members 20, 30 are drivingly forward pushed and the guide pin 422 of the locating block 42 is slid backward along the first guide channel 411 until the guide pin 422 drops into the V-shaped guide channel 413.

Figure 14:
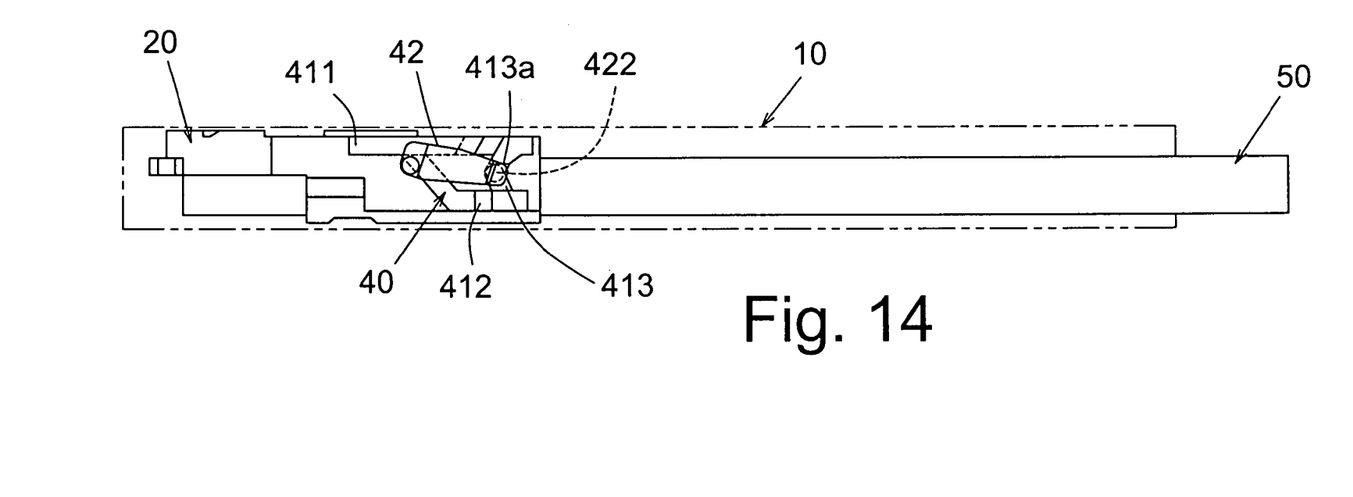
FIG. 14 shows the relationship between the components of the locating unit, in which the electronic card is released for the first time from the state of FIG. 13.

As shown in FIGS. 10 and 14, then the user can stop pushing the electronic card 50 and release the electronic card 50 for the first time. At this time, the first and second slide members 20, 30 are respectively driven by the springs 20a, 30a to slightly retreat. The guide pin 422 is stopped by the first stop shoulder 411a from moving back into the first guide channel 411. Therefore, the guide pin 422 is positioned in the V-shaped guide channel 413. Under such circumstance, the first and second slide members 20, 30 are stably located in a still state. Also, the electronic card 50 is electrically connected with the terminals of the terminal seat 12 for reading, loading or transmitting data.

Figure 15:
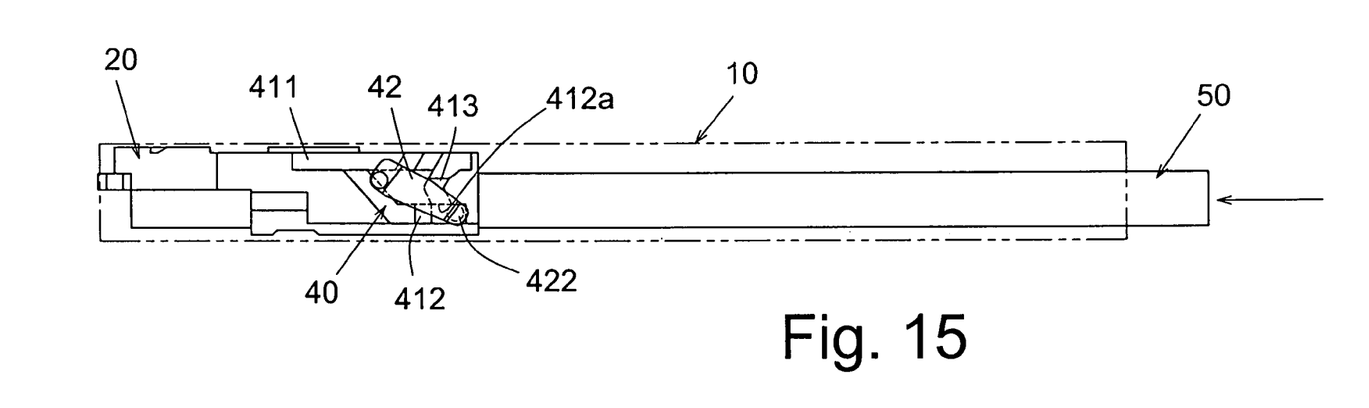
FIG. 15 shows the relationship between the components of the locating unit, in which the electronic card is forward pushed from the state of FIG. 14.
Figure 16:
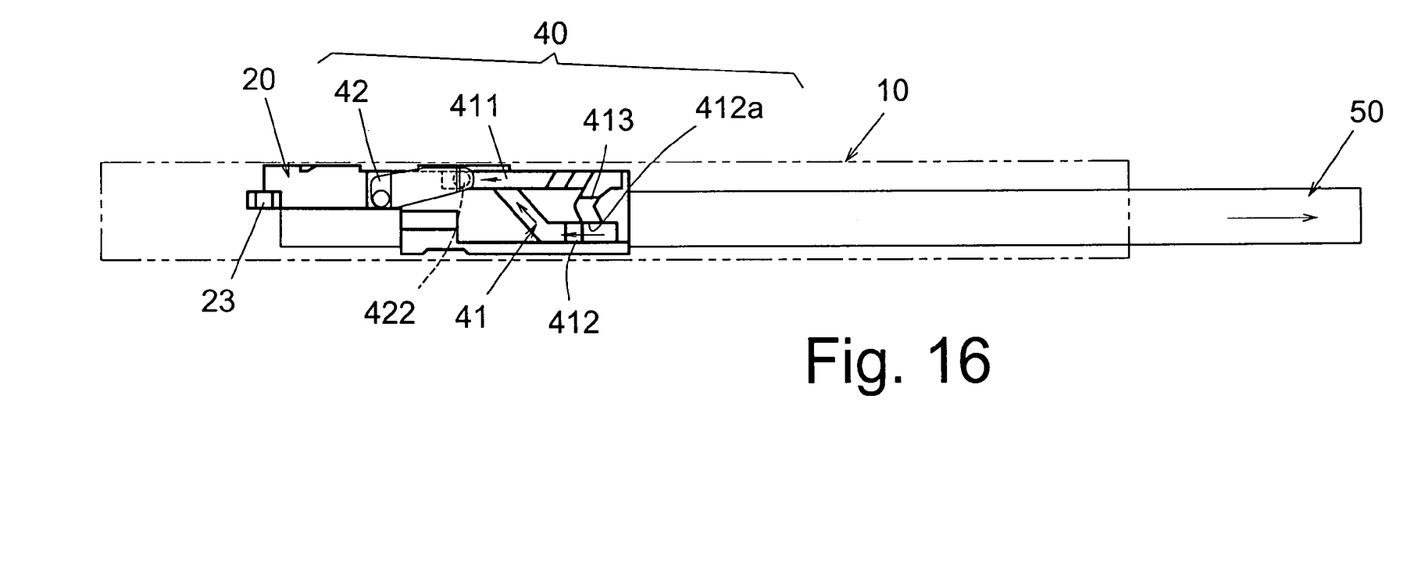
FIG. 16 shows the relationship between the components of the locating unit, in which the electronic card is released from the state of FIG. 15 and completely extracted out of the electronic card connector.

When the user desires to take out the electronic card 50, the user can again forward push the electronic card 50 from the state of FIGS. 10 and 14 into the state of FIG. 15. At this time, the electronic card 50 again forward pushes the first and second slide members 20, 30. The guide pin 422 is stopped by the second stop shoulder 413a in the V-shaped guide channel 413 from moving back into the first guide channel 411. Therefore, the guide pin 422 is slid into the second guide channel 412. At this time, the user can release the electronic card 50, whereby the two springs 20a, 30a resiliently restore to simultaneously backward pull back the first and second slide members 20, 30. At this time, the stop walls 211, 311 of the first and second slide members 20, 30 push two sides of front end of the electronic card 50 to retreat the electronic card 50 out of the insertion socket 11 of the electronic card connector as shown in FIGS. 9 and 16. In the card-extracting operation, the guide pin 422 of the locating block 42 is stopped by the third stop shoulder 41a from moving back into the V-shaped guide channel 413. Therefore, the guide pin 422 is slid forward along the second guide channel 412 into the first guide channel 411 in a direction of the arrow of FIG. 15. At this time, a cycle of card insertion and card extraction is completed.

The locating unit 40 can be simply disposed between the first slide member 20 and the corresponding guide rail 111. Alternatively, the locating unit 40 can be simply disposed between the second slide member 30 and the corresponding guide rail 112. Still alternatively, as shown in FIG. 1, there are two locating units 40 respectively disposed between the first and second slide members 20, 30 and the corresponding guide rails 111, 112.

The present invention is characterized in that the first and second slide members 20, 30 are resiliently slidably disposed on two opposite sides of the electronic card connector. In card-retreating operation, the first and second slide members 20, 30 at the same time push two sides of the electronic card 50, whereby a force is evenly applied to the electronic card 50 to stably slide and retreat the electronic card 50 out of the insertion socket 11 of the electronic card connector. Therefore, the card-extracting operation is smoothened.

The above embodiments are only used to illustrate the present invention, not intended to limit the scope thereof. Many modifications of the above embodiments can be made without departing from the spirit of the present invention.

What is claimed is:

1. An electronic card connector capable of driving both sides of an electronic card to extract the electronic card, the electronic card connector comprising:
   (a) a main body formed with an insertion socket, a terminal seat being disposed at front end of the insertion socket;
   (b) a first slide member slidably disposed on a first side of the insertion socket, the first slide member serving to abut against a first side of an electronic card inserted in the insertion socket, a spring being hooked between the first slide member and the main body, whereby in normal state, the spring forces the first slide member away from the terminal seat; and
   (c) a second slide member slidably disposed on a second side of the insertion socket opposite to the first slide member, the second slide member serving to abut against a second side of an electronic card inserted in the insertion socket, a spring being hooked between the second slide member and the main body, whereby in normal state, the spring forces the second slide member away from the terminal seat, the two springs being able to synchronously drive and retreat the first and second slide members to push and extract the electronic card out of the electronic card connector.

2. The electronic card connector as claimed in claim 1, wherein two opposite sides of the insertion socket of the main body are respectively formed with two guide rails in which the first and second slide members are respectively correspondingly accommodated, the first and second slide members being guided by the guide rails to stably slide along two opposite sides of the insertion socket, two projecting hooks being respectively disposed on two sides of the main body for hooking first ends of the springs for driving the first and second slide members.

3. The electronic card connector as claimed in claim 1, wherein the terminal seat has an insulating seat body, the insulating seat body being formed with multiple terminal cavities which are side by side arranged, a terminal being inlaid in each terminal cavity, two sides of the insulating seat body being formed with locating projecting sections which are correspondingly latched in latch holes of sidewalls of the insertion socket.

4. The electronic card connector as claimed in claim 1, wherein a connecting member is inlaid in each side of the insulating seat body, whereby when the terminal seat is latched in the insertion socket, the connecting member is tightly hooked with the main body.

5. The electronic card connector as claimed in claim 1, wherein a carrier platform section is transversely formed at front end of each of the first and second slide members, a stop wall being formed on front edge of the carrier platform section for abutting against front edge of each side of the electronic card inserted in the insertion socket.

6. The electronic card connector as claimed in claim 2, wherein a bottom end of each of the first and second slide members is formed with a locating dent, whereby when the first and second slide members are retreated within the guide rails to a certain position, the wall of the locating dent abuts against a locating projecting section formed in each of the guide rail to stop the first and second slide members from being further pulled backward by the springs.

7. The electronic card connector as claimed in claim 1, wherein a hook arm projects from one side of each of the first and second slide members, the hook arm extending out of the guide rail to hook second end of the spring.

8. The electronic card connector as claimed in claim 1, further comprising a locating unit including:
   (a) a guide channel section formed on the first slide member, the guide channel section including a first guide channel and a second guide channel, a V-shaped guide channel communicating rear ends of the first and second guide channels, a front end of the second guide channel obliquely connecting with the first guide channel;
   (b) a locating block, a first end of the locating block having a shaft section pivotally mounted on the sidewall of the insertion socket of the main body, a second end of the locating block having a projecting guide pin slidably positioned in the guide channel section; and
   (c) a resilient arm formed on the sidewall of the insertion socket, in normal state, the resilient arm pushing the second end of the locating block toward the guide channel section, whereby the guide pin of the second end of the locating block is extended into the guide channel section and can be stably slid within and along the guide channel section.

9. The electronic card connector as claimed in claim 8, wherein a first stop shoulder is formed between the rear end of the first guide channel and the V-shaped guide channel, a second stop shoulder being formed at the middle of the V-shaped guide channel, a third stop shoulder being formed between the V-shaped guide channel and an entrance of front end of the second guide channel, the stop shoulders serving to prevent the guide pin of the locating block from moving from the second guide channel along the V-shaped guide channel back to the first guide channel.

10. The electronic card connector as claimed in claim 1, further comprising a locating unit including:
    (a) a guide channel section formed on the second slide member, the guide channel section including a first guide channel and a second guide channel, a V-shaped guide channel communicating rear ends of the first and second guide channels, a front end of the second guide channel obliquely connecting with the first guide channel;
    (b) a locating block, a first end of the locating block having a shaft section pivotally mounted on the sidewall of the insertion socket of the main body, a second end of the locating block having a projecting guide pin slidably positioned in the guide channel section; and
    (c) a resilient arm formed on the sidewall of the insertion socket, in normal state, the resilient arm pushing the second end of the locating block toward the guide channel section, whereby the guide pin of the second end of the locating block is extended into the guide channel section and can be stably slid within and along the guide channel section.

11. The electronic card connector as claimed in claim 10, wherein a first stop shoulder is formed between the rear end of the first guide channel and the V-shaped guide channel, a second stop shoulder being formed at the middle of the V-shaped guide channel, a third stop shoulder being formed between the V-shaped guide channel and an entrance of front end of the second guide channel, the stop shoulders serving to prevent the guide pin of the locating block from moving from the second guide channel along the V-shaped guide channel back to the first guide channel.

\* \* \* \* \*